(12) United States Patent
Ridgeway et al.

(10) Patent No.: US 7,458,528 B2
(45) Date of Patent: Dec. 2, 2008

(54) FLUID MISTING APPARATUS

(76) Inventors: Gilbert Ridgeway, 8115 W. Floyd Ave., Lakewood, CO (US) 80227; John A. Wilson II, 5936 W. 74th Pl., Westminster, CO (US) 80003

( * ) Notice: Subject to any disclaimer, the term of this patent is extended or adjusted under 35 U.S.C. 154(b) by 0 days.

(21) Appl. No.: 11/307,132

(22) Filed: Jan. 25, 2006

(65) Prior Publication Data

US 2007/0170280 A1    Jul. 26, 2007

(51) Int. Cl.
*B05B 17/00* (2006.01)
*B05B 15/00* (2006.01)
*B60K 25/00* (2006.01)
*B60K 17/28* (2006.01)

(52) U.S. Cl. .................. 239/329; 239/172; 239/289; 239/332; 180/53.8

(58) Field of Classification Search ............. 239/329, 239/332, 172, 289, 24, 146, 152–157, 302, 239/379; 180/53.8, 53.1; 280/288.4, 200, 280/201; 296/78.1
See application file for complete search history.

(56) References Cited

U.S. PATENT DOCUMENTS

| | | | |
|---|---|---|---|
| 4,807,813 A | 2/1989 | Coleman | 239/153 |
| 4,815,635 A | 3/1989 | Porter | 222/136 |
| 5,201,442 A * | 4/1993 | Bakalian | 222/610 |
| 5,326,124 A * | 7/1994 | Allemang | 280/288.4 |
| 5,595,262 A * | 1/1997 | Martin | 184/15.2 |
| 5,613,371 A | 3/1997 | Nelson | 62/244 |
| D381,711 S | 7/1997 | Englert | D21/145 |
| 5,645,404 A * | 7/1997 | Zelenak | 417/1 |
| 5,967,415 A | 10/1999 | Utter | 239/152 |
| 6,182,463 B1 | 2/2001 | Strussion et al. | 62/314 |
| 6,196,474 B1 | 3/2001 | Hillerson | 239/289 |
| 6,722,679 B2 * | 4/2004 | Englert | 280/288.4 |
| 6,938,831 B1 * | 9/2005 | Brown | 239/34 |
| 2003/0201340 A1* | 10/2003 | Hanson | 239/332 |
| 2006/0016907 A1* | 1/2006 | Miles, Jr. | 239/172 |
| 2006/0083763 A1* | 4/2006 | Neale et al. | 424/405 |

* cited by examiner

*Primary Examiner*—Darren W Gorman
(74) *Attorney, Agent, or Firm*—Roger A. Jackson

(57) ABSTRACT

A fluid misting apparatus and method that is adapted to be attached to a cycle having an energy source, the fluid misting apparatus includes a reservoir for containing a fluid and a centrifugal pump that is powered by the energy source, wherein the pump is in fluid communication with the reservoir, with the pump being operational to produce a fluid flow and fluid pressure from the fluid in the reservoir. Also included is a nozzle that is in fluid communication with the pump, the nozzle is operational to direct an atomized fluid mist adjacent to a cycle rider by utilizing the pump fluid flow and fluid pressure.

12 Claims, 6 Drawing Sheets

FLUID MISTING APPARATUS

TECHNICAL FIELD

The present invention generally relates to a fluid misting apparatus that utilizes evaporative cooling to cool an individual for comfort when an external environment relative to the individual is warmer than the individual desires. More particularly, the present invention relates to a pressurized fluid misting apparatus that atomizes a fluid into a fine mist that is adjacent to the individual, thus giving the individual a comforting sensation of being cooled through the evaporative effect of the fine mist adjacent to the individual.

BACKGROUND OF INVENTION

It is often desirable and/or necessary for safety and health reasons for an individual to control their body temperature to a comfortable level in the external environment relative to that individual that is warmer than individual desires. This is especially true in the situation wherein the individual must remain in the uncomfortably warm external environment for any length of time due to the type of activity that they are engaged in. These activities can range from being at an outdoor concert or event, engaging in physically active activities in the warm external environment such as running, jogging, walking, playing various sports, bicycling, motorcycling, or any other similar type activity that the individual is engaged in of necessity is in the undesirably warm external environment. Typically, in the above situation, conventional refrigerant type air conditioning is either unavailable or inefficient in the sense that the refrigerant type air conditioning equipment's large size, heavy weight, having risks with the environment concerning CFC's and HCFC's, and significant electrical power requirements needed are not practical to be utilized, as the individual can very likely be located outside in the external environment in a remote/rural geographic area. Thus, for the individual to remain comfortably cool in the aforementioned environmental conditions an apparatus must be portable, in other words small in size, small in weight, and require minimal electrical power. Additionally, it is preferable that the portable cooling apparatus be simple in design, such that a minimum of parts and controls are utilized for better reliability and again contributing to minimal size and weight as desirable features. This naturally leads to evaporative water cooling which currently is utilized in two forms, either water soaking a porous pad material wherein a fan forces air flow through the pad, with the evaporative effect of the water in the pad resulting in cool feeling humid air discharging from the pad. The other form is using mist cooling wherein high pressure water at a very low flow rate is discharged through a nozzle that creates a very fine atomized mist that cools the ambient air in close proximity to the nozzle and when the fine mist comes into contact with an individual the quick evaporation of the mist has a cooling effect upon the individual. The preferred evaporative cooling system that is for the use of an individual being highly portable for size, weight, and electrical power consumption reasons is the nozzle that creates a very fine atomized mist, which is commonly used on outdoor patios, spectator stands at sport events, and the like. Other advantages of the nozzle mist system especially for an individual in an outside environment are that the size and weight of the system can be kept minimal, there are low power requirements, and there are no environmental issues with CFC's and HCFC's.

The need for a portable individual cooling system is somewhat recognized in the prior art although most of the systems are hindered in their effectiveness by the total lack of electrical power available, requiring batteries, which add size and weight, and also having a limited useful life, or having the need to generate the electrical power or directly drive a pump, for instance from the wheel of a bicycle, or utilize a manual hand pump, all of which of course causes an individual to generate more metabolic heat in the undesirably warm external environment, thus requiring even more cooling from the system that is limited in its cooling capabilities in the first place. A first example is given in U.S. Pat. No. 6,196,474 to Hillerson that discloses a pressurized bicyclist water spraying apparatus that is adapted to be mounted on a bicycle, wherein the apparatus utilizes a conventional bicycle head and tail light generator that is driven off the bicycle wheel which in turn provides electric power for an electric pump which is really acting as a compressor to pressurize the interior of a reservoir with air. Hillerson further discloses that the air pressurized reservoir (which also desirably requires a pressure relief valve) will allow a flow of water to be communicated to a nozzle that provides a stream of fluid to the bicycle rider that apparently the bicyclist either drinks the spray of water or soaks themselves with the spray of water for a refreshing/cooling effect. In addition, Hillerson teaches an optional electric small capacity fan that is positioned such that the fan helps direct the spray of water toward the bicycle rider. Hillerson does not address the capacity issue with the reservoir being partially filled with pressurized air with the remaining portion of the reservoir being filled with water, wherein once the bicycle rider receives an initial spray of water there is apparently some amount of recharge time required for the air compressor to recharge the reservoir with air pressure to enable the bicyclist to receive another spray of water. This makes the utility of the Hillerson apparatus marginal not only as water sprays must be occasional time wise, also that dousing the bicycle rider with the water spray may not always be desirable as the bicycle riders clothing and shoes would eventually be soaked with water and when combined with Hillerson's complexity does not result in an optimal apparatus for cooling the bicycle rider.

Further, in U.S. Pat. No. 4,815,635 to Porter disclosed is a bicyclist water supply apparatus that by utilizing a manually operated hand diaphragm pump delivers a spray of cooling water from a first reservoir again similar to Hillerson to douse the bicycle rider with the spray of water or in the alternative by use of a valve selectable second reservoir to deliver a spray of a desired solution other than water to drink for the bicycle rider. In addition to the previously mentioned problems of Hillerson, Porter requires that the bicycle rider be distracted from their attention to the road to enable them to manually hand pump the diaphragm pump, which further reduces the bicycle rider safety. Continuing, and in a sense of combining Hillerson and Porter in U.S. Pat. No. 4,807,813 to Coleman disclosed is a bicycle having a tire driven pump, as opposed to Hillersons's tire driven generator, wherein Coleman has the tire driven pump draw from a handlebar mounted reservoir, however, with the pump discharge being mounted on the helmet of the bicycle rider to be used as it water toy. Coleman states that the objective of invention is to promote helmet use for the bicycle rider, resulting in this invention not having any bicycle rider cooling or refreshment capabilities. Yet further, in the bicycle water gun area in U.S. design Pat. No. D381, 711 to Englert disclosed is a handlebar mounted water gun nozzle that in addition has a rearward facing water gun nozzle that utilizes a bicycle frame mounted reservoir and pump. Englert in being similar to Coleman solely discloses a water gun or water toy that is strictly for bicycle rider amusement and does not teach either cooling or refreshment of the bicycle rider.

In moving away from the prior art water spray systems adapted to be attached to bicycles in U.S. Pat. No. 5,967,415 to Utter disclosed is a portable mist cooling device that is adapted to be attached to an individual via a belt, that utilizes a pressurized container with a valve that allows the release of fluid from the container and a spray nozzle that is in fluid communication with the valve, the spray nozzle can be directed anywhere the individual desires. Utter creates pressure within the container by the use of a manually operated hand air pump operated by the individual wearing the portable mist cooling device, of course Utter suffers from some of the same shortcomings as Porter in requiring the individual to manually pump the device to receive the water spray not being much different than a conventional plastic spray bottle. Continuing, in U.S. Pat. No. 6,182,463B1 to Strussion et al., disclosed is a portable evaporative cooling apparatus that includes a fan for generating an airflow over a set of water spray nozzles that are fed by a separate water pump and reservoir. Thus, Strussion et al., recognizes that the evaporative cooling effect is enhanced from the fan that generates the airflow and also the beneficial evaporative cooling effect of having the water at a lower temperature as opposed to a higher temperature which is especially important in exterior environments that tend to be more humid which lessens the effectiveness of the cooling effect of evaporative cooling systems, thus having cooler water pumped into the water spray nozzles in more humid exterior environments attempts to regain a portion of the cooling effectiveness of evaporative cooling systems. However, Strussion et al., is not really portable in that the apparatus requires utility (110 VAC) electrical power to operate.

Continuing further, for the application of an evaporative cooling water mist system to a golf cart in U.S. Pat. No. 5,613,371 to Nelson disclosed is a method and apparatus for misting vehicle occupants that includes a fluid reservoir that is in fluid communication with a pump which in turn forces water into an accumulator until a desired pressure is attained within the accumulator, wherein the system is activated by opening a solenoid valve to release the pressurized water in the accumulator that is in fluid communication with the misting nozzles. Nelson utilizes the accumulator to trap air to store energy for supplying the water to the misting nozzles that is under a substantially constant pressure, as the accumulator is implemented to reduce the pressure and flow pulsation to the misting nozzles. However, in Nelson the use of the accumulator and solenoid further complicates the water mist system, that serves to recognize the problem inherent in all cooling water mist system is in that the misting nozzles typically have extremely small orifices that act to take the liquid water flow upstream of the nozzle and turned it into a finely atomized water mist by creating a significant pressure drop of the liquid water flow thereby converting the liquid water flow into almost a gas like state that lends itself to rapid evaporation. Thus, Nelson identifies an issue in the use finely atomizing water mist nozzles in that these nozzles typically have an orifice diameter of about 0.008 inches that nominally allow only about 1.25 gallons of water per hour at a differential pressure of 1000 pounds per square inch.

Generally speaking from a fluid dynamics standpoint this results in that it is significantly difficult to find a water pump that can operate at a flow rate of 1.25 gallons of water per hour while generating 1000 pounds per square inch of pressure with the pump drawing from an atmospheric pressure water reservoir. In other words, the aforementioned flow rate is extremely low in combination with the aforementioned pressure that is extremely high. To meet these pumping requirements it is normally required to use a positive displacement type pump, such as a piston pump, or a diaphragm pump, or the like that are complex and expensive in addition to creating a pulsating discharge flow, wherein a pulsating discharge flow it is undesirable from the atomizing water mist nozzles as the mist will tend to "spit" at the individual. To overcome this problem from a fluid dynamic standpoint several solutions are typically used, firstly an accumulator can be utilized to decouple the pump output from the mist flow, this is accomplished by keeping the accumulator partially full of water from a pump wherein another portion of the accumulator contains a pressurized air filled bladder that keeps the water under pressure in the accumulator, thus the result is a smoother steady flow of water from the accumulator under pressure to the misting nozzle. Secondly, another solution is to partially fill reservoir with water and sealing the reservoir and injecting the reservoir with high-pressure air (very similar to a traditional house garden insecticide spray tank with a hand air pump which also utilizes a small low flowrate spray nozzle that atomizes a fluid into a fine mist) with the nozzle output results much the same as the accumulator in Nelson above. Summarily, it would result in a much simpler to eliminate the accumulator or reservoir with the pressurized air/water interface, i.e. to simply use just a reservoir and a pump that pulls water from the reservoir and discharges the water directly to the misting nozzle.

The previously mentioned air/water interface is utilized in the above-mentioned prior art for Hillerson, Utter, and Strussion et al. (who utilizes a diaphragm pump bypass to lessen the pressure pulsating effect). The other solution to this issue that is really more indirect amounts to greatly increasing the flow rate through the nozzle and correspondingly reducing the pressure required on the upstream side of the nozzle that can allow a more conventional pump to the used, as in the identified prior art above for Porter and Coleman, however with this arrangement the effective cooling mist from the nozzle is lost, wherein the nozzle discharge more nearly resembles a spray of liquid (not atomized into a fine mist). Outside of the previously mentioned issues concerning the mist nozzle low flow rates and high pressures, evaporative water mist cooling especially for an individual in an outside environment is very attractive since the size and weight of the system can be kept minimal, there are low power requirements, and there are no environmental issues with CFC's and HCFC's. However, evaporative water mist cooling quickly loses its effectiveness in higher humidity environments which can be partially overcome with the use of colder water which enhances the evaporation and effective cooling process in high humidity environments by converting the evaporative water cooling process from having constant enthalpy to a partial heat energy reduction process.

What is needed, especially in the case of motorcycles is an efficient and effective portable cooling system due to the excess heat energy that is directed toward the motorcycle rider that is in addition to the ambient exterior environmental heat. This excess heat energy comes from the motorcycle engine itself, whether the motorcycle engine is air cooled or fluid cooled there is still a significant amount of heat energy coming from the engine cylinder and head cooling fins or from the radiator structure, unquestionably a portion of which is directed toward the motorcycle rider. In addition, on a hot sunny day, the reflection of solar heat energy from the black asphalt roadbed reflects upward toward the motorcycle rider and in heavy road traffic situations the excess heat energy from other vehicles engine radiators on the road that are in close proximity to the motorcycle rider further add to the total heat energy that the motorcycle rider is subjected to. Even though the motorcycle rider is not necessarily generating much in the way of metabolic body heat by nearly statically sitting on the motorcycle, except in the case of a motorcycle racing situation wherein the metabolic heat generated by the motorcycle rider could increase, the combination of motorcycle engine heat, road solar reflective heat, and other vehicle heat is significant for the motorcycle rider to be exposed to that is in addition to the ambient exterior environmental heat. It is important for the motorcycle rider from a safety and fatigue standpoint to remain comfortable and alert and not to suffer from any significant degree of heat exhaustion and fatigue, given that a motorcycle rider is typically fairly heavily clothed, i.e. leather jacket, leather gloves, leather boots, leather chaps or heavy weight denim pants, and possibly a helmet for protection from the elements and safety, thus making it difficult for the motorcycle rider to rid themselves of excess body heat. However, in the motorcycle rider's favor is the fact that when the motorcycle is traveling down the road the air velocity passing over the motorcycle rider in and of itself aids in cooling the motorcycle rider by the motorcycle rider's bodies perspiration that results in some limited form of evaporative cooling. Significantly, with the addition of an external fluid misting apparatus positioned in front of the motorcycle rider the air velocity passing over the motorcycle rider aids in expediting the evaporative cooling effect upon the motorcycle rider.

Thus, structurally what is desired for the motorcycle rider is a fluid misting apparatus that utilizes evaporative cooling as the most practical approach to keeping the motorcycle rider comfortable and alert on a hot day, wherein the apparatus would be adapted for use on the motorcycle by utilizing the electric pump that receives power from the motorcycle electrical system, with the pump drawing from a reservoir that can optionally be filled with ice water with the pump discharging directly to the mist nozzles, with the system effectively concealed from visual observation or designed as an aesthetic addition to the motorcycles appearance. Note that the pump would be selected so as not to require any flow or pressure control valving, accumulators, or any intermediate air/water interface reservoirs, so as to keep the apparatus as simple and reliable as possible.

SUMMARY OF INVENTION

Broadly, the present invention of a fluid misting apparatus and method that is adapted to be attached to a cycle having an energy source, the fluid misting apparatus includes a reservoir for containing a fluid and a centrifugal pump that is powered by the energy source, wherein the pump is in fluid communication with the reservoir, with the pump being operational to produce a fluid flow and pressure from the fluid in the reservoir. Also included is a nozzle that is in fluid communication with the pump, the nozzle is operational to direct an atomized fluid mist adjacent to a cycle rider by utilizing the pump fluid flow and pressure.

These and other objects of the present invention will become more readily appreciated and understood from a consideration of the following detailed description of the exemplary embodiments of the present invention when taken together with the accompanying drawings, in which;

REFERENCE NUMBER IN DRAWINGS

Figure 1:
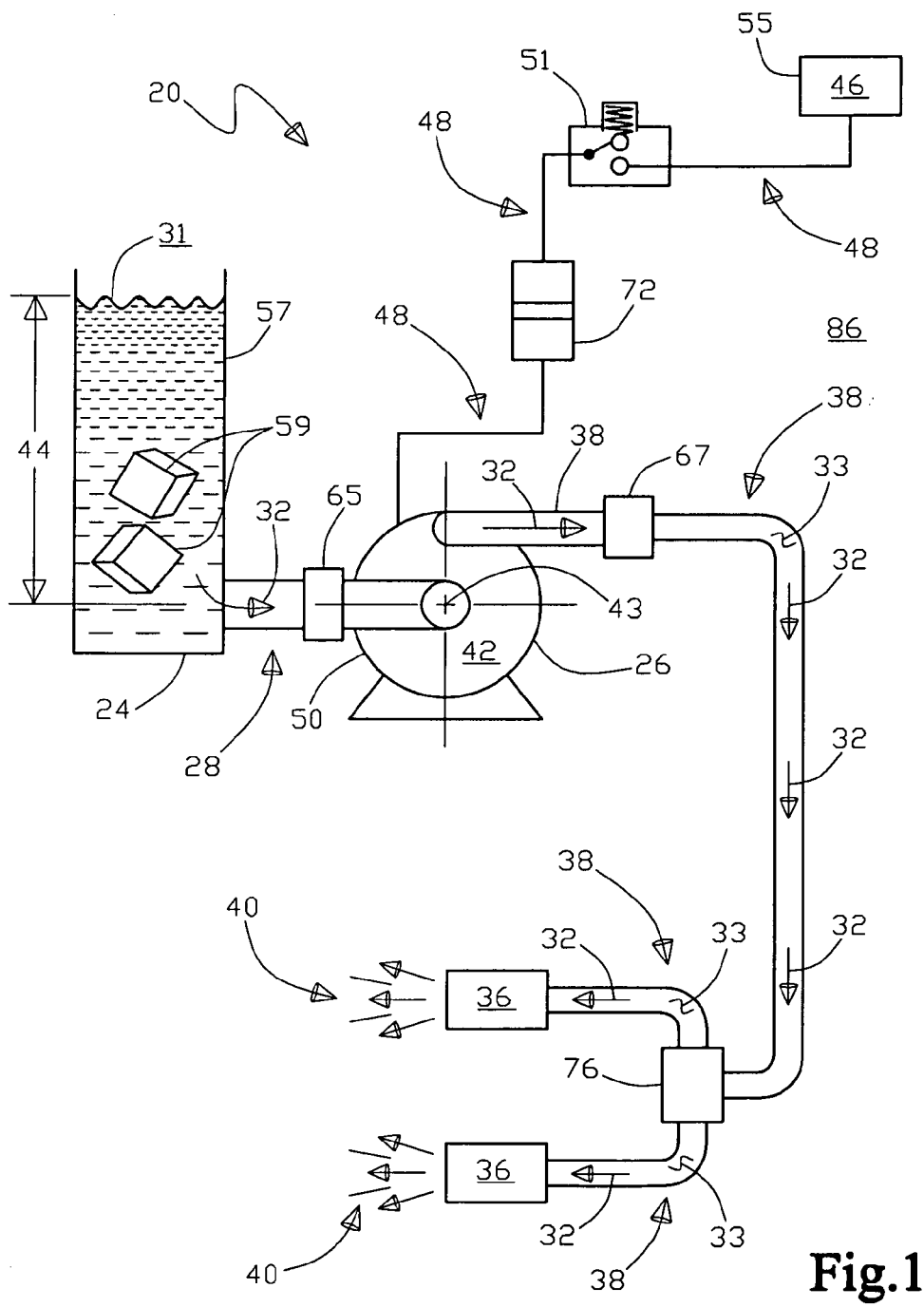
FIG. 1 is a schematic block diagram for the fluid misting apparatus.

20 Fluid Misting Apparatus
22 Individual
24 Means for containing a fluid 31
26 Pump
28 Fluid communication between pump 26 and means for containing a fluid 24
30 Manually energized
31 Fluid
32 Flow of fluid 31
33 Pressure of fluid 31
36 Nozzle
38 Fluid communication between nozzle 36 and pump 26
40 Atomized mist of fluid 31
42 Centrifugal type pump 26
43 Centrifugal type pump rotational axis
44 Net Positive Suction Head (NPSH)
46 Power supply
48 Electrical communication between power supply 46 and electric motor 50
50 Electric motor to drive pump 26
51 Control
53 Cycle
55 Energy source
57 Reservoir
59 Ice cubes
61 Cycle rider
63 Clamp, reservoir 57
65 Valve that is selectively removably engagable between reservoir 57 and fluid communication between pump 26 and means for containing a fluid 28
67 Valve that is selectively removably engagable between pump 26 and fluid communication between pump 26 and nozzle 36
70 Clamp, pump 26
72 Electrical connection that is selectively removably engagable between electric motor 50 electrical communication 48 and energy source 55
76 Tee to parallel split flow 32 of fluid 31 in fluid communication 38 to allow a plurality of nozzles 36
78 Cycle windscreen
80 Cycle dashboard
82 Cycle fairing
84 Cycle saddlebag
86 External environment
88 External environment airflow
90 Backpack

DETAILED DESCRIPTION

Figure 2:
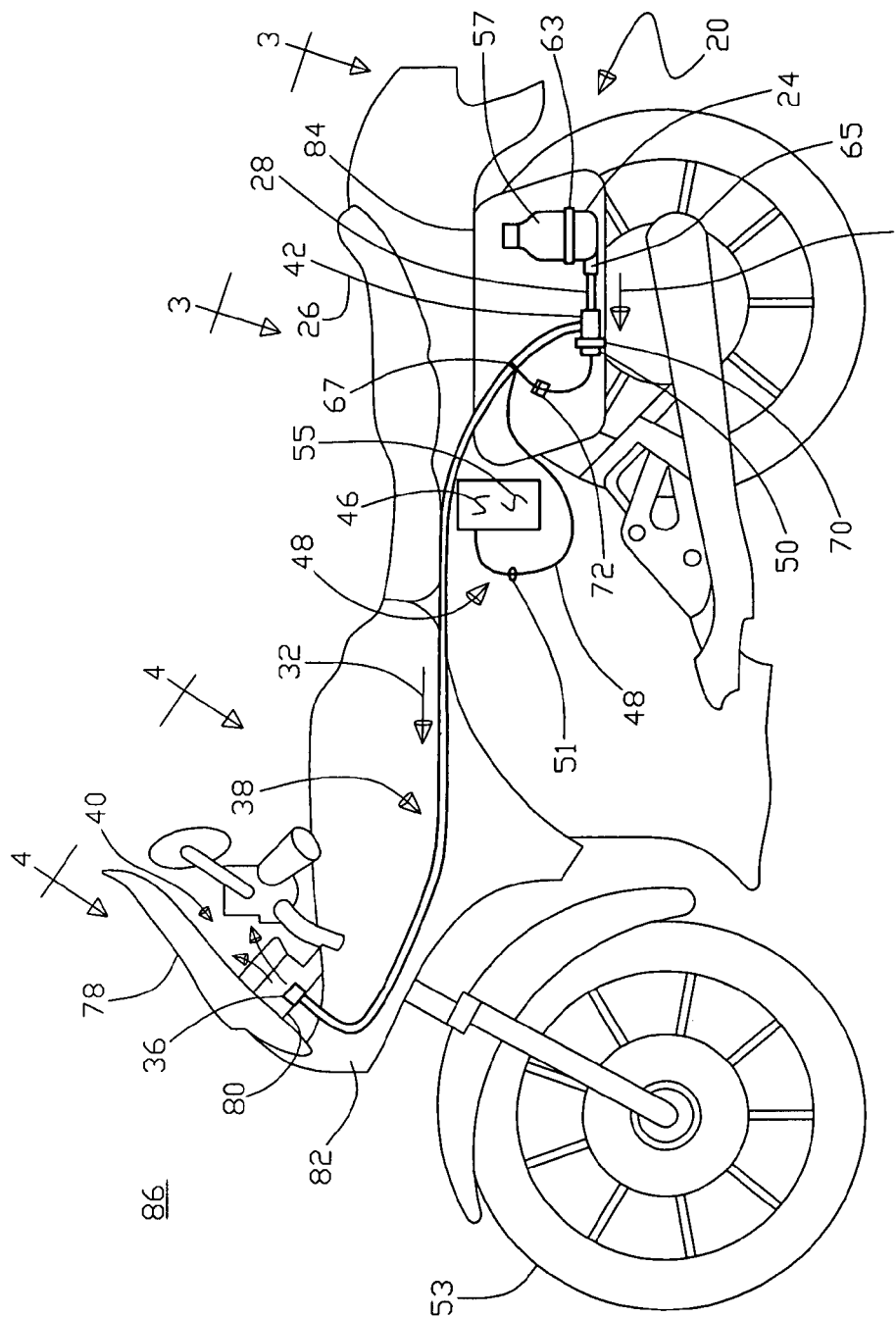
FIG. 2 shows a side view of a cycle with the elements of the fluid misting apparatus exposed to indicate their relative positions in relation to the cycle.
Figure 3:
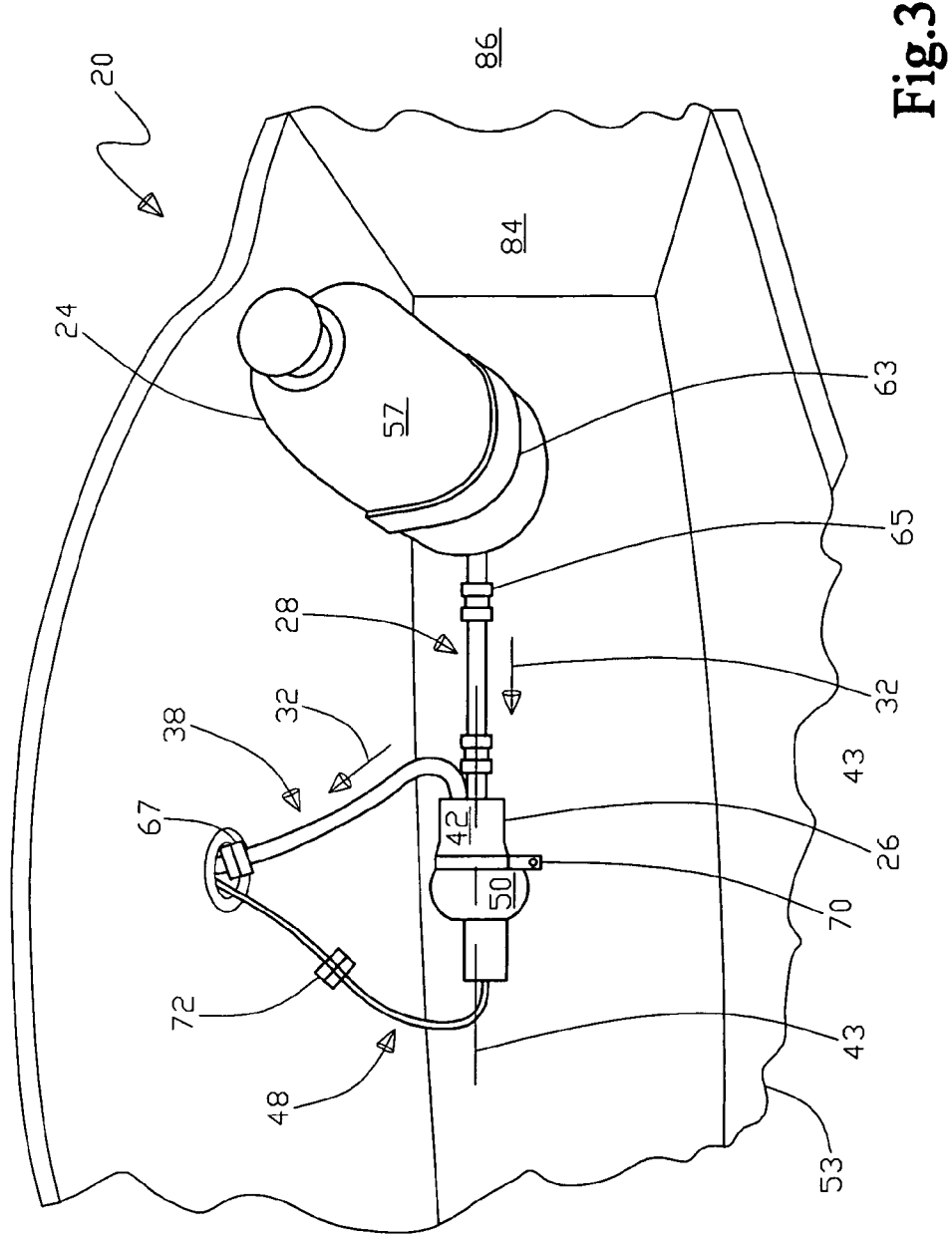
FIG. 3 shows overhead view 3-3 from FIG. 2 to give an expanded view of the fluid misting apparatus disposed within a cycle saddlebag.
Figure 4:
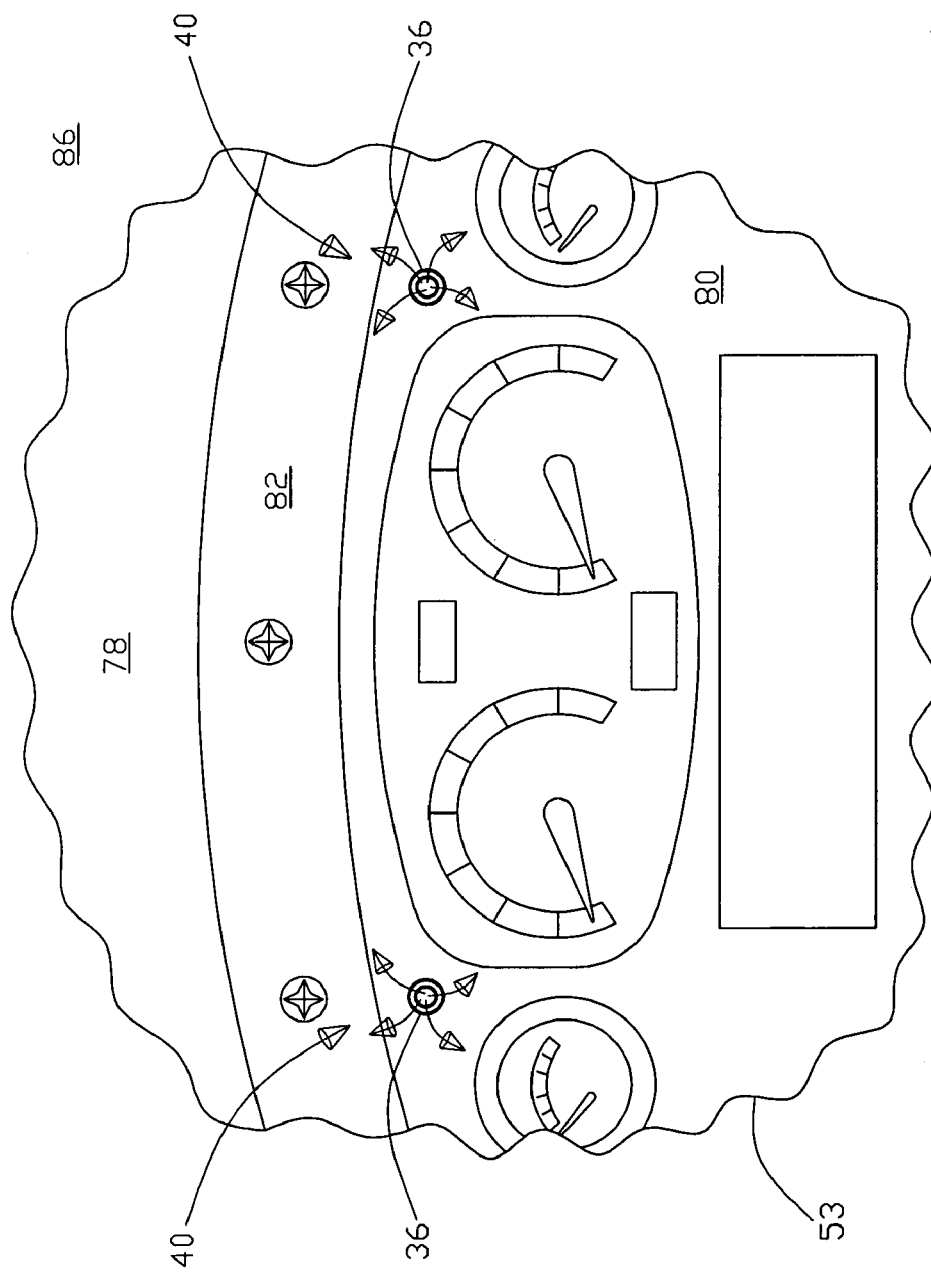
FIG. 4 shows overhead view 4-4 from FIG. 2 to give an expanded view of the cycle dashboard with the nozzles.
Figure 5:
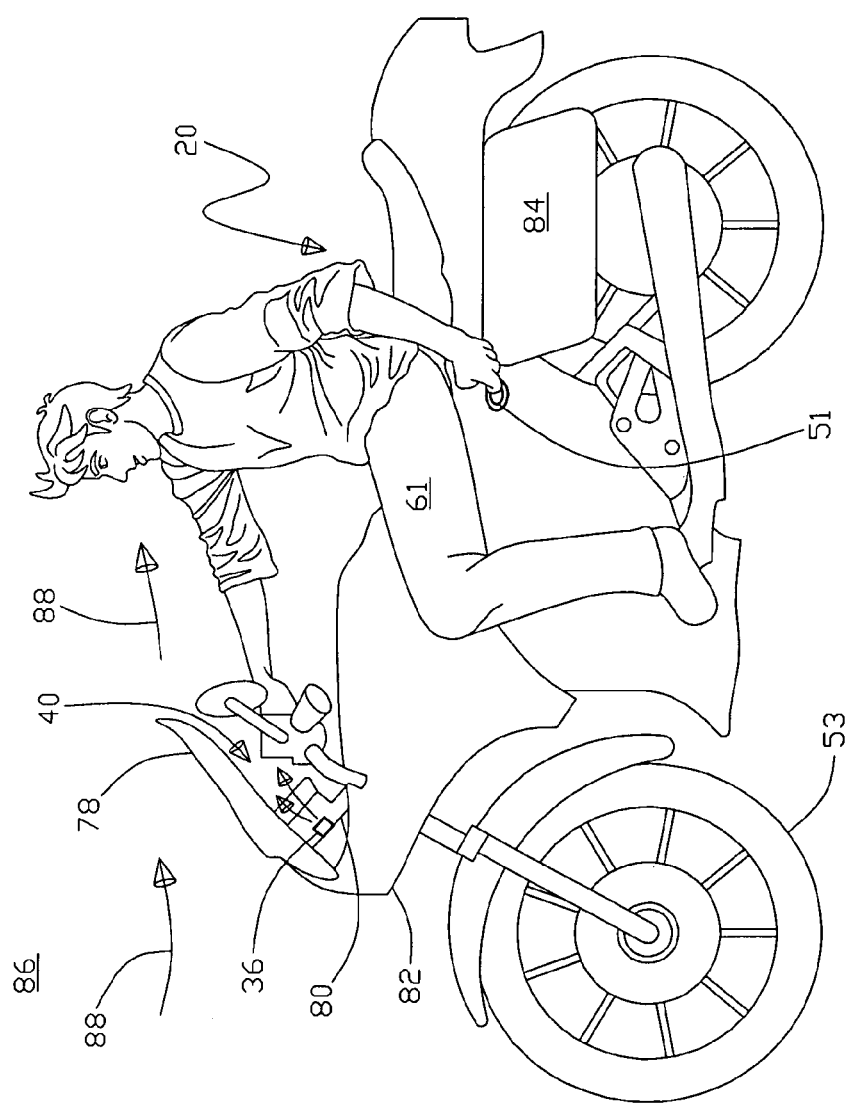
FIG. 5 shows the fluid misting apparatus in use on the cycle with a cycle rider utilizing a control to activate the fluid misting apparatus with their left hand.
Figure 6:
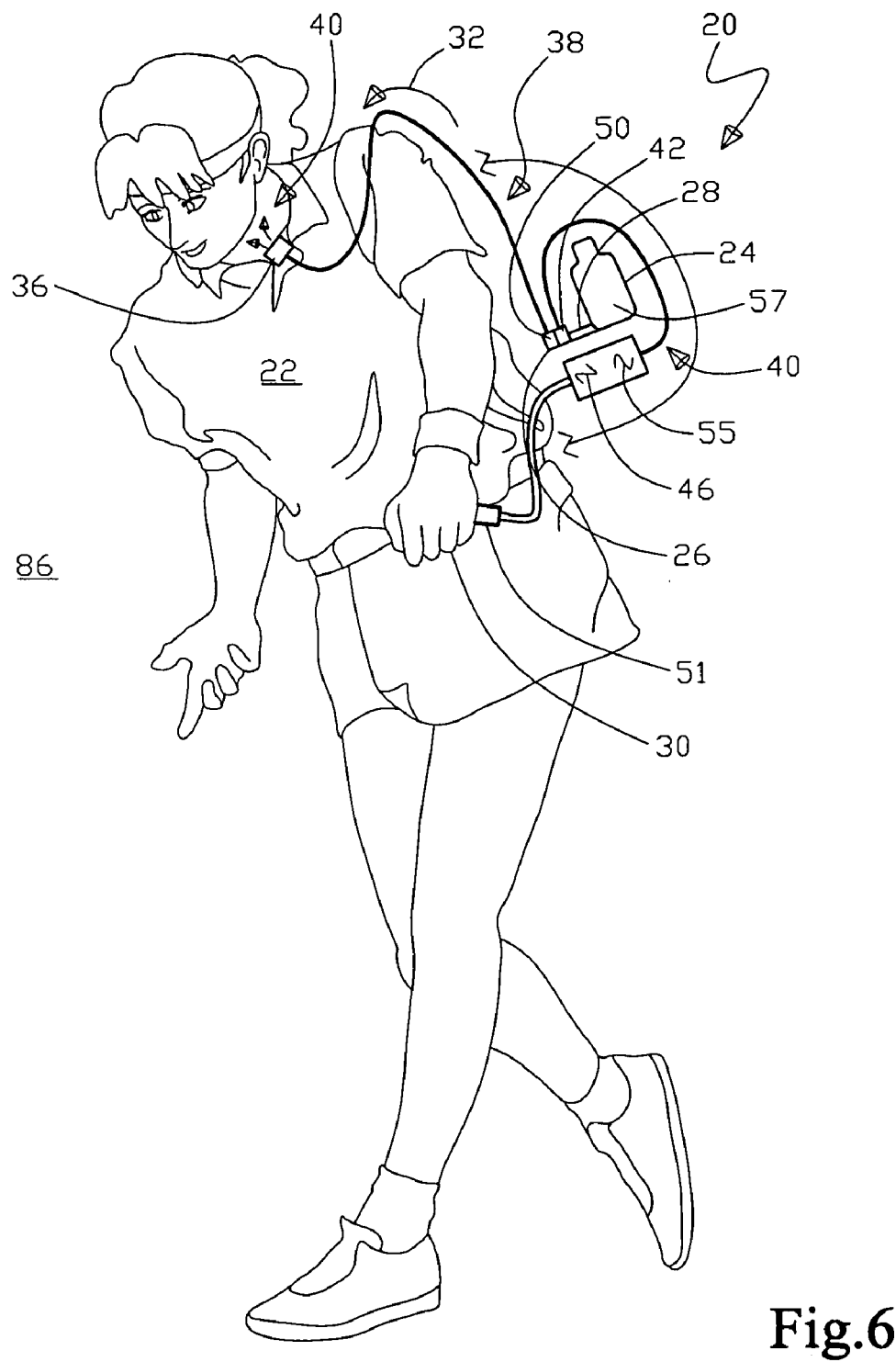
FIG. 6 shows an alternative embodiment of the fluid misting apparatus in use with an active individual utilizing a control to activate the fluid misting apparatus with their left hand.

With initial reference to FIG. 1 shown is a schematic block diagram for the fluid misting apparatus 20, FIG. 2 shows a side view of a cycle 53 with the elements of the fluid misting apparatus 20 exposed to indicate their relative positions in relation to the cycle 53 physical structure, and FIG. 3 shows overhead view 3-3 from FIG. 2 to give an expanded view of the fluid misting apparatus 20 disposed within a cycle 53 saddlebag 84. FIG. 4 shows overhead view 4-4 from FIG. 2 to give an expanded view of the cycle 53 dashboard 80 with the nozzles 36, FIG. 5 shows the fluid misting apparatus 20 in use on the cycle 53 with a cycle rider 61 utilizing a control 51 to activate the fluid misting apparatus 20 with their left hand, and FIG. 6 shows an alternative embodiment of the fluid misting apparatus 20 in use with an active individual 22 utilizing a control 51 to activate the fluid misting apparatus 20 with their left hand.

The fluid misting apparatus 20 for an individual 22, includes a means 24 for containing a fluid 31, preferably the means 24 for containing a fluid is a reservoir 57 that is constructed of 1050A aluminum being desirably a brand name Agrochem 42, Item Number A110040 that has a capacity of thirty seven fluid ounces having the approximate dimensions of three and one half inches in diameter by nine and one half inches high. The aforementioned reservoir 57 is constructed from one piece of aluminum that includes a forty two millimeter diameter screw cap top used for refilling the reservoir 57 with fluid 31, which is preferably water. Note that under external environmental 86 conditions of relatively high humidity, for instance being greater than about 50% relative humidity, the reservoir 57 is optionally sized and configured to hold ice cubes to increase the cooling effectiveness of the fluid misting apparatus 20 by utilizing a cooler fluid 31, wherein ice cubes 59 can be added to the fluid 31 which further aids in the fluid evaporating at a higher rate thus helping to enhance the cooling effect in higher humidity external environmental 86 conditions, wherein the higher humidity external environmental 86 conditions will act to reduce the ability of the fluid 31 to evaporate thus reducing the cooling effect. Because of this, the aforementioned screw top cap is optionally sized and configured to accept ice cubes 59 as an optional enhancement for the cooling effectiveness of the fluid misting apparatus 20. Also concerning the reservoir 57, alternative constructions would be acceptable in addition to what was previously specified that could include plastics, other metallurgies such as stainless steel, brass, bronze, copper, and the like being made from a multitude of different processes such as molding, fabrication stamping, spinning, and the like also, that are suitable for the external environmental 86 conditions and for containing the fluid 31 which in addition to water could have scents, nutritional, taste, or other desired qualities in any combination in the fluid 31.

Also included in the fluid misting apparatus 20 is a pump 26 that is in fluid communication 28 with the reservoir 57, the pump 26 is manually energized 30 to be operational to produce a fluid 31 flow 32 and pressure 33 from the fluid 31 in the reservoir 57. Referring in particular to FIG. 6 the manual energizing 31 can be accomplished by the individual 22 by the use of either or both of their hands to impart energy to drive the pump 26 which would typically be rotational in nature or reciprocative depending upon the pump 26 type that is utilized as is known in the art. As the preferred pump 26 type is a centrifugal pump 42 being a Ningbo Xiangsheng Friction Material Co. LTD model number XS 204 that is actually a combination of a twelve volt direct current electric motor 50 direct driven centrifugal pump 42 utilizing a radial vane impeller rotating within a housing with the pump 42 suction (referring to the fluid communication 28) being substantially parallel to the pump 42 motor 50 rotational axis 43 and the pump 42 discharge (referring to the fluid communication 38) being tangential to the impeller outer periphery (not shown) as evidenced by the position of fluid communication 38.

A centrifugal pump 42 was selected for several reasons; the first is that centrifugal pumps have substantially pulsation free flow 32 which is desirable to eliminate the problem with the nozzles 36 "spitting" the atomized mist 40 at the individual 22 which is undesirable and aggravates the water 31 drops that can form at the nozzle 36 outlet, resulting in making the individual "wet" instead of being evaporatively cooled while the individual 22 stays relatively dry. Secondly, the centrifugal pump 42 is one of the more reliable pump types as there are no contacting parts internal to the centrifugal pump 42, the impeller rotates within the casing but does not make physical contact to the casing, which aids in the centrifugal pump 42 having a long trouble-free life. Thirdly, as alluded to in the field and background section of this application, the unique fluid 31 flow 32 and pressure 33 requirements of the nozzle 36 limit the type of pump that can be utilized. The nozzle 36 requires an extremely low flow rate in the range of about 0.2 gallons per hour to about 1.25 gallons per hour wherein the nozzle 36 has a differential fluid 31 pressure 33 of up to about 1000 pounds per square inch. This requires a pump 42 that can operate at an extremely low flow rate 32 and at an extremely high differential pressure 33, and as previously stated normally only positive displacement pumps such as piston pumps or diaphragm pumps can meet these needs. The problems with piston pumps and diaphragm pumps are that they are heavy, large, and complex, also not being nearly as reliable and simple as a centrifugal pump 42, thus the piston and diaphragm pumps having a higher number of parts that contact each other resulting in wear over the time of pump use. Thus, the simplified application of a small relatively trouble-free centrifugal pump 42 without the need for the extra components of an accumulator or air pressure system to push the fluid 31 for flow 32 and pressure 33 for the nozzle 36 to work correctly, i.e. to generate an atomized mist 40 of fluid 31, is advantageous because the centrifugal pump 42 discharge is directly in fluid communication 38 with the nozzle 36 resulting in a much simplified fluid misting apparatus 20 than has previously been utilized requiring fewer components and therefore being more reliable, in addition to consuming less size and weight, all of which are desirable features of the fluid misting apparatus 20.

Also included in the fluid misting apparatus 20 is a nozzle 36 that is in fluid communication 38 with the pump 42, with the nozzle 36 being operational to direct an atomized fluid 31 mist 40 at the individual 22 by utilizing the pump 42 fluid 31 flow 32 and pressure 33. The nozzle 36 is preferably a brand Mistcooling model number 00002 brass misting nozzle 36 that has an internal orifice diameter of 0.008 inches with a rated water usage of 1.25 gallons per hour at 1000 pounds per square inch differential pressure. Alternatively, the nozzle 36 could be constructed of other materials such as stainless steel, aluminum, plastics, and the like that would be compatible with the fluid 31. What is important functionally for the nozzle 36 is that it converts the fluid 31 into an atomized mist 40, thus other types of nozzles 36 would be acceptable as long as the aforementioned functional requirements were met. Note that is optional to include a plurality of nozzles 36 to enhance the comfort of the cooling effect for the individual 22, for the fluid misting apparatus 20 wherein the nozzles 36 are arranged in a parallel configuration as best shown in FIG. 1 utilizing a fluid 31 flow 32 tee 76. The tee 76 is preferably a brand name Alkon Corporation model number AQ64 DOT union tee that acts to split the fluid 31 flow 32 in a parallel manner thus allowing a plurality of nozzles 36 to the utilized.

Alternative components to the preferred tee 76 would be acceptable that can meet the above-mentioned functional requirements of the fluid 31 compatibility and the above mentioned flow 32 and pressure 33. Note that for both the fluid communication 28 and the fluid communication 38 preferably industrial grade polyethylene tubing is used that is a brand name Hosexpress series model number 221 that has a nominal size of one quarter inch in diameter with a nominal outside diameter of 0.17 inches and a nominal wall thickness of 0.04 inches with a max working pressure of 140 pounds per square inch. Alternatively, for both the fluid communication 28 and the fluid communication 38 other materials and sizes would be acceptable that would be compatible with the fluid 31 and the flow 32 and the pressure 33 as it is described the following section.

For the fluid misting apparatus 20 in utilizing the preferred centrifugal pump 42, bench testing has shown that in using the previously preferred components as described for the reservoir 57, centrifugal pump 42, and nozzle 36 the nominal flow rate 32 of the fluid 31 is 0.3 gallons per hour at a nozzle 36 differential pressure 33 of twenty two pounds per square inch, thus these previously mentioned conditions of the fluid 31 flow 32 and pressure 33 would represent the sizing and configuring of the centrifugal pump 42 at the previously mentioned desired flow rate 32 and pressure 33 of the fluid 31 that acts to further increase the atomized mist 40 of the fluid 31 in a substantially pulsation free flow, while at the same time minimizing the undesirable feature of the nozzle 36 "spitting" or forming water droplets at the nozzle 36 outlet. However, one required feature of the centrifugal pump 42 is to have sufficient net positive suction head 44 (NPSH) as shown in FIG. 1 available at the centrifugal pump 42 inlet being identified as the centrifugal pump 42 rotational axis 43 also as shown in FIG. 1. What this means is that the centrifugal pump 42 requires a positive pressure of fluid 31 or termed being flooded at the axis 43 with the fluid 31, in other words the centrifugal pump 42 cannot suck or draw the fluid 31 upward as against gravity. Thus, this requires that the position of the reservoir 57 especially relating to the interface of the fluid communication 28 must be above the centrifugal pump 42 axis 43 as is shown in FIG. 1. The minimum amount of net positive suction head 44 required for the centrifugal pump 42 under the previously stated desired flow rate 32 and pressure 33 of the fluid 31 is about 1 inch. Another item of note in an advantage of the centrifugal pump 42 is that it has the ability to run dry momentarily without suffering damage which is a feature that most other types of pumps do not have, thus in the instance of the centrifugal pump 42 being activated to the point where the reservoir 57 is emptied of fluid 31 resulting in the ceasing of the atomized mist 40 of the fluid 31 at the nozzle 36, if the centrifugal pump 42 stays momentarily activated beyond this point it will not suffer any damage.

The fluid misting apparatus 20 if utilizing the electric motor 50 driven centrifugal pump 42 will include a power supply 46 to power the electric motor 50 and as previously stated the electric motor 50 requires a standard twelve volt direct current power requiring a nominal current of about 3.5 amps, preferably for the individual 22 this power supply 46 can be in the form of a battery as is known in the prior art, or alternatively a generator that could be hand driven by the individual 22 as a further option to manually energizing 30 the centrifugal pump 42 for the fluid misting apparatus 20. The power supply 46 would be in electrical communication 48 with the electric motor 50. For the electrical communication 48 it is preferably an automotive type primary wire that is a brand name Allied Wire and Cable part number SXL 20 that is twenty gage in size having strands 7/28 with an insulation thickness 0.029 inches, alternatively for the electrical communication 48 other wire sizes and types would be acceptable that would meet the functional performance requirements as previously described.

To further aid the capability of the individual 22 in selectively activating and deactivating the electric motor 50 and thus the centrifugal pump 42 a control 51 is optionally included. The control 51 is preferably a brand Alps Electric, Inc. SKHC series model number SKHCADA010 raised plunger style pushbutton switch that has a switch function as a momentary contact that is normally open with a switching mechanism of a single pole, single throw switch. Thus the control 51 is a selectable momentary activation of the electric motor 50 from the power supply 46 for the centrifugal pump 42 to activate by the individual 22, in other words when the button is pushed by the individual 22 the centrifugal pump 42 will activate the atomized mist 40 of the fluid 31 out of the nozzle 36 and when the individual 22 releases the button the centrifugal pump 42 deactivates, thus stopping the atomized mist 40 from the nozzle 36. The control 51 is located within the electrical communication 48 as best shown in FIG. 1. Alternative components for the control 51 would be acceptable if they can meet the functional requirements as identified above. Note that in referring to FIG. 6 for the use of the fluid misting apparatus 20 by the individual 22 the fluid misting apparatus 20 can be contained within a typical hiking or camping backpack 90 to contain all the aforementioned components for the fluid misting apparatus 20.

As the preferred embodiment of the fluid misting apparatus 20, the fluid misting apparatus 20 is adapted to be attached to a cycle 53. The cycle 53 is preferably a motorcycle, however, it could also be a bicycle, wherein the bicycle would require modifications as are well-known to the art to provide a power supply 46 as previously described either through a battery or a generator that can be driven off the bicycle wheel also as is well-known in the art. Concerning the reservoir 57, and the reservoir 57 option to be sized and configured to hold ice cubes and 59, the fluid communication 28, the fluid communication 38, the electrical communication 48, the electric motor 50, the centrifugal pump 42, the power supply 46, the nozzle 36, including the plurality of nozzles 36, and the control 51 are all the same for the adaptation to the cycle 53 as previously described for the individual 22. Thus, the following description will focus upon the unique aspects of the fluid misting apparatus 20 being adapted to attach to the cycle 53. Note in the case of a motorcycle 53 the power supply 46 would simply be the motorcycle 53 electrical system, however, it could be optionally utilize an alternative energy source 55 that could be something other than electrical such as either hydraulic, or directly driven off the motorcycle engine, or the utilizing the motorcycle exhaust flow or any other usable energy source that would be available on the motorcycle 53. Of necessity, the control 51 when used for a non electrical energy source 55 would have a different physical structure but a similar function as previously described, i.e. in the case of directly driving the centrifugal pump 42 for the motorcycle engine control 51 would be a device that rotationally engages and disengages the centrifugal pump 42 for the motorcycle engine as an example.

For the fluid misting apparatus 20 to be adapted to the cycle 53 and in focusing upon FIGS. 1, 2, 3, 4, and 5, the system as schematically shown in FIG. 1 is used much the same as for an individual 22 as previously described. Starting with FIG. 2 it can be seen that the fluid misting apparatus 20 is substantially disposed within the cycle 53 to be substantially hidden from view that would be apparent to an observer for their external visual perception of the cycle 53. FIG. 2 shows the components of the fluid misting apparatus exposed for clarity, starting with the cycle 53 saddlebag 84 wherein the outer cover of the saddlebag 84 is cut away to show the location of the reservoir 57, the fluid communication 28, the centrifugal pump 42, the electric motor 50, and a portion of the fluid communication 38. In referring to FIG. 3 an expanded overhead view of the cycle saddlebag 84 with the previously mentioned components is more clearly shown. Thus the cycle saddlebag 84 is conductive to substantially concealing the previously mentioned components. In addition, the remaining portion of the fluid communication 38 is either substantially hidden from an external view or is aesthetically sized and configured to blend in or match the cycle 53 color and/or materials scheme. Note that in the case of the cycle 53 not having saddlebags 84, all of the previously mentioned components of the fluid misting apparatus 20 could be aesthetically sized and configured to match the cycle 53 color and/or materials scheme. In addition, the power supply 46 and the electrical communication 48 are also substantially concealed within the cycle 53, with the only exposed portions being the control 51 and the nozzles 36 which are fashioned to have a built in appearance wherein the control 51 is preferably positioned just below the cycle 53 seat on the left side of the cycle 53 and the nozzles 36 are built into the cycle 53 dashboard 80 as is best shown in FIG. 4.

Returning to the cycle saddlebag 84, there is the desired optional capability to have the previously mentioned components that are in the cycle saddlebag 84 selectively removably engagable from the cycle 53, this would either be by removal of the complete cycle saddlebag 84 from the cycle 53 or the individual component removal, namely the reservoir 57, centrifugal pump 42, and electric motor 50 as being removable from the cycle saddlebag 84. Focusing in particular on FIG. 3, the reservoir 57 includes a reservoir 57 clamp 63 that allows the reservoir 57 to be selectively removably engagable from the cycle saddlebag 84. The clamp 63 is preferably a brand name Grainger extinguisher bracket being identified as item number 4T307 that has a compression clamp that is secured around the outer body of the reservoir 57, wherein in the clamp 63 is affixed to the cycle saddlebag 84 and is selectively removably engagable to the reservoir 57. Alternatively, the clamp 63 could be of another design that would perform the previously described requirement of selectively removably engaging the reservoir 57 and the cycle saddlebag 84. Continuing, to further allow the reservoir 57 to be removable from the cycle saddlebag 84, valve 65 is utilized to provide a selectively removably engagable interconnect between the reservoir 57 and the fluid communication 28. The valve 65 is preferably a brand name Alkon Corporation quick disconnect coupler that utilizes a combination of a model number AP98 T component and a model number AP94M4 component that act together to provide a quick disconnect coupling between the reservoir 57 and the fluid communication 28 with the additional feature of a valve shut off for the reservoir 57 to prevent any residual fluid 31 that is in the reservoir 57 from leaking out when the reservoir 57 is separately removed. Alternative options for the valve 65 would be acceptable as long as the previously described functional requirements were met.

Additionally, for the fluid communication 38 a quick disconnect coupling valve 67 is provided as is the shown in FIG. 3, wherein the valve 67 utilizes the same preferable components as in valve 65 with the addition of a bulkhead fitting also from Alkon Corporation that is a model number AP94B that allows a valve connection to fluid communication 38 for a selectively removably engagable connection on the inside wall of the cycle saddlebag 84. Further continuing, on the electric motor 50 and centrifugal pump 42 combination being selectively removably engagable from the cycle 53 or more particularly from the cycle saddlebag 84 a clamp 70 is utilized to selectively removably engage the electric motor 50 and centrifugal pump 42 combination to the cycle saddlebag 84. Clamp 70 is preferably a conventional substantially circular selectively removable compression clamp that selectively removably engages to the electric motor 50 and centrifugal pump 42 combination from the cycle saddlebag 84, while the clamp 70 is affixed to the cycle saddlebag 84. Yet further, on the electrical communication 48 there is an electrical connection 72 that allows for a selectively removable engagement of the electrical communication 48 as is best shown in FIG. 3. Preferably electrical connection 72 is a brand name Packard Electric electrical connector with a male component model number of 12124582 and with a male housing number of 12015792 mating with a female component model number of 12124580 and with a female housing component model number of 12010973, wherein all the previously mentioned components for electrical connection 72 utilize a weather pack seal model number of 12015323. Thus, electrical connection 72 allows for a selectively removably engagable electrical communication 48 for removal of either the electric motor 50 and centrifugal pump 42 combination from the cycle saddlebag 84 or removal of the cycle saddlebag 84 from the cycle 53. Alternatives to electrical connection 72 would be acceptable as long as they meet the previously described requirements.

METHOD OF USE

A method for producing an evaporative cooling effect upon a cycle rider 61 on a cycle 53 having an energy source 55, comprises the steps of first providing a fluid misting apparatus 20 that is adapted to attach to the cycle 53, the apparatus 20 includes a reservoir 57, a centrifugal pump 42 in fluid communication 28 with the reservoir 57, and a nozzle 36 that is in fluid communication 38 with the pump 42. The next step would being filling the reservoir 57 with the fluid 31 which is preferably water so that the water is retained in the reservoir 57. Note that with the reservoir 57 capacity of 37 fluid ounces and with the desired nozzle 36 flow rate of 0.3 gallons per hour, the reservoir 57 would be able to supply the pump 42 for a time period of approximately fifty seven minutes, assuming the use of a single nozzle 36. Thus, considering that the pump 42 would be activated on an intermittent basis the reservoir 57 would provide adequate misting for the cycle 53 rider 61 for at least a ride long enough to exceed that which the cycle 53 rider 61 would have to refuel or take a break from riding being approximately a four hour stretch of riding time. Further continuing, the next step would be to activate the pump 42 such that the pump 42 provides flow 32 and pressure 33 to the fluid 31 in a substantially pulsation free pressure through the nozzle 36, wherein the pump 42 is activated by the energy source 55 as previously described, resulting in the nozzle 36 producing a finely atomized water mist in close proximity to the cycle 53 rider 61.

Optionally, a control 51 as previously described can be added to allow for selectively activating and deactivating of the pump 42 from the energy source 55 by the cycle 53 rider 61 while riding the cycle 53 as the shown in FIG. 5. Note that the evaporative cooling effectiveness is also enhanced by the cycle 53 moving along the road as when the external environment air flow 88 circulates around the fairing 82 and the windscreen 78, the evaporation rate of the atomized water mist 40 from the nozzle 36 is increased due to the air flow 88, resulting in an increased cooling effect upon the cycle 53 rider 61 from the fluid misting apparatus 20.

CONCLUSION

Accordingly, the present invention of a fluid misting apparatus has been described with some degree of particularity directed to the embodiments of the present invention. It should be appreciated, though, that the present invention is defined by the following claims construed in light of the prior art so modifications the changes may be made to the exemplary embodiments of the present invention without departing from the inventive concepts contained therein.

What is claimed is:

1. A fluid misting apparatus that is adapted to be attached to a cycle having an energy source, comprising:
   (a) a reservoir for containing a fluid;
   (b) a centrifugal pump that is powered by the energy source, said pump is in fluid communication with said reservoir, said pump is operational to produce a fluid flow and fluid pressure from the fluid in said reservoir; and
   (c) a nozzle that is in fluid communication with said pump, said nozzle is operational to direct an atomized fluid mist adjacent to a cycle rider by utilizing said pump fluid flow and fluid pressure.

2. A fluid misting apparatus according to claim 1 wherein said pump is sized and configured to operate at a desired flowrate and pressure to further increase atomization of the fluid mist in a substantially pulsation free flow.

3. A fluid misting apparatus according to claim 1 further comprising a control that is operational to selectively activate and deactivate said pump.

4. A fluid misting apparatus according to claim 1 further comprising a plurality of nozzles that are in parallel fluid communication with said pump.

5. A fluid misting apparatus according to claim 1 wherein said reservoir is sized and configured to hold ice cubes.

6. A fluid misting apparatus according to claim 1 wherein said pump is driven by an electric motor utilizing the energy source.

7. A fluid misting apparatus according to claim 1 wherein said apparatus is sized and configured to be substantially disposed within the cycle, being operational to be substantially hidden from an external perceptible view of the cycle.

8. A fluid misting apparatus according to claim 1 wherein said apparatus is sized, configured, and appearing to substantially aesthetically match the cycle perceptible external visual presentation.

9. A fluid misting apparatus according to claim 1 wherein said reservoir is selectively removably engagable from the cycle.

10. A fluid misting apparatus according to claim 1 wherein said pump is selectively removably engagable from the cycle.

11. A method for producing an evaporative cooling effect upon a cycle rider on a cycle having an energy source, comprising the steps of:
    (a) providing a fluid misting apparatus that is adapted to attach to the cycle, said apparatus includes a reservoir, a centrifugal pump in fluid communication with said reservoir, and a nozzle that is in fluid communication with said pump;
    (b) retaining water in said reservoir; and
    (c) pumping the water at a substantially pulsation free pressure directly through said nozzle utilizing the energy source, wherein said nozzle produces a finely atomized water mist in close proximity to the cycle rider.

12. A method for producing an evaporative cooling effect according to claim 11 further comprising a step of providing a control for selectively activating and deactivating said pump.

* * * * *